United States Patent [19]

Nilson et al.

[11] 4,436,342

[45] Mar. 13, 1984

[54] FURNITURE JOINT ASSEMBLY

[75] Inventors: Warren C. Nilson, Omro; Thomas L. Rabe, Oshkosh, both of Wis.

[73] Assignee: The Buckstaff Company, Inc., Oskosh, Wis.

[21] Appl. No.: 317,499

[22] Filed: Nov. 2, 1981

[51] Int. Cl.³ .............................................. A47C 1/12
[52] U.S. Cl. ..................... 297/445; 52/583; 52/585; 52/586; 297/239; 297/440; 108/153; 403/381; 403/409
[58] Field of Search ................ 52/583, 582, 586, 585; 108/153; 403/266, 267, 409, 381; 297/445, 440, 239

[56] References Cited

U.S. PATENT DOCUMENTS

| 456,381 | 7/1891 | Andrus | 52/585 X |
|---|---|---|---|
| 685,555 | 10/1901 | Ashby | 403/267 |
| 1,194,305 | 8/1916 | McMillan | 52/583 |
| 1,272,131 | 7/1918 | Silberg | 52/585 X |
| 2,373,808 | 4/1945 | Brown | 52/586 X |
| 2,650,943 | 9/1953 | Leuchs et al. | 403/267 X |
| 2,651,355 | 9/1953 | Lucas | 297/445 |
| 3,351,365 | 11/1967 | Bickl | 52/586 X |

Primary Examiner—James T. McCall
Attorney, Agent, or Firm—Andrus, Sceales, Starke & Sawall

[57] ABSTRACT

A joint assembly for connecting a pair of furniture components includes a wedge shaped groove extending inwardly along the surface of one of the furniture components and a matching wedge shaped groove in the surface of the other furniture component. A chip member that is disposed between the two furniture components has a wedge shaped notch that cooperates with the wedge shaped grooves in the furniture components to define a wedge receiving recess located along the surface formed by the joining of the two furniture components and the chip member. A wedge member is then disposed within the recess formed by the joining of two furniture components and the chip member.

14 Claims, 2 Drawing Figures

FURNITURE JOINT ASSEMBLY

BACKGROUND OF THE INVENTION

This invention relates to furniture assembly and more particularly to a joint assembly for connecting two furniture components.

In typical furniture joint assemblies e.g. mortise and tenon, dowel, lap etc. one of the furniture components is reduced in size so that it can fit into the other furniture component. This results in a reduced surface area for application of glue or cement and thus the resulting joint is not as strong as desired.

It is therefore desirable to have a joint assembly that utilizes full size material in order to give the maximum amount posible of surface contact for the glue and thus a joint assembly with superior strength.

It is also desirable to have a joint assembly that resists the bending, rotational and shearing forces typically present at the rear joint of a chair.

SUMMARY OF THE INVENTION

A joint assembly for connecting two furniture components includes a wedge shaped groove extending inwardly along the side surface of one of the furniture components and a substantially identical wedge shaped groove extending inwardly along the side surface of the other furniture component.

A chip member disposed between the two furniture components includes a wedge shaped notch that cooperates with the wedge shaped grooves to define a wedge shaped opening located along the surface formed by the joining of the furniture components and the chip member.

A wedge member is then disposed within the wedge receiving recess.

Such an assembly results in the maximum surface possible for contact of the glue and the wedge member counteracts the shear forces associated with a furniture joint.

In accordance with another aspect of the invention, a dowel is disposed within one of the furniture components with its grain substantially perpendicular to that of the component. The use of the dowel prevents wood failure in the component due to bending.

In accordance with yet another aspect of the invention, a series of screws are disposed on either side of the dowel to secure the chip member and wedge member. Such an arrangement counteracts the rotational forces acting on the joint.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
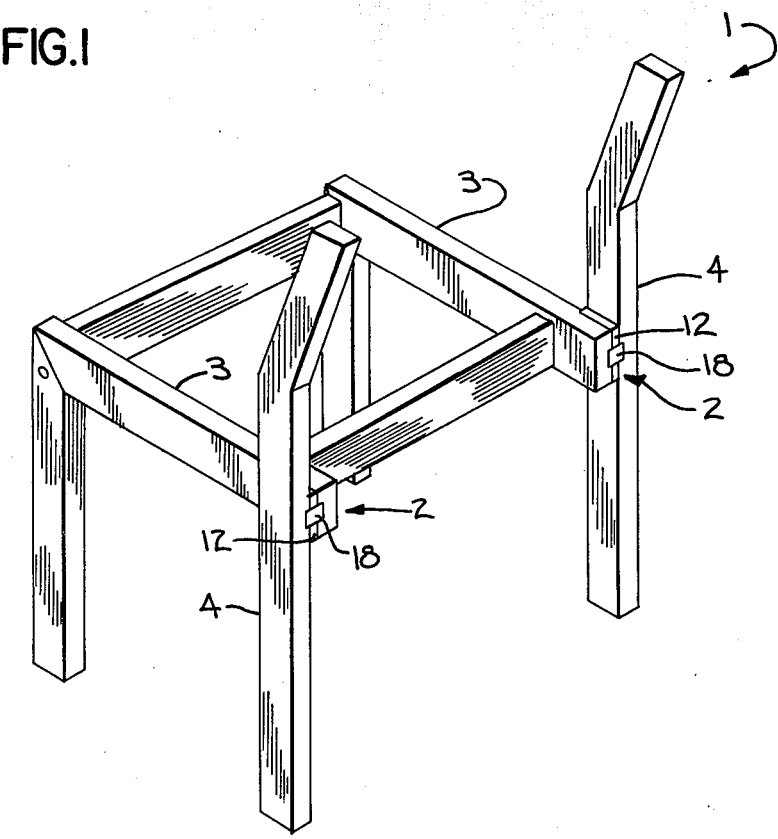
FIG. 1 is a perspective view of an article of furniture utilizing the joint assembly of the present invention.
Figure 2:
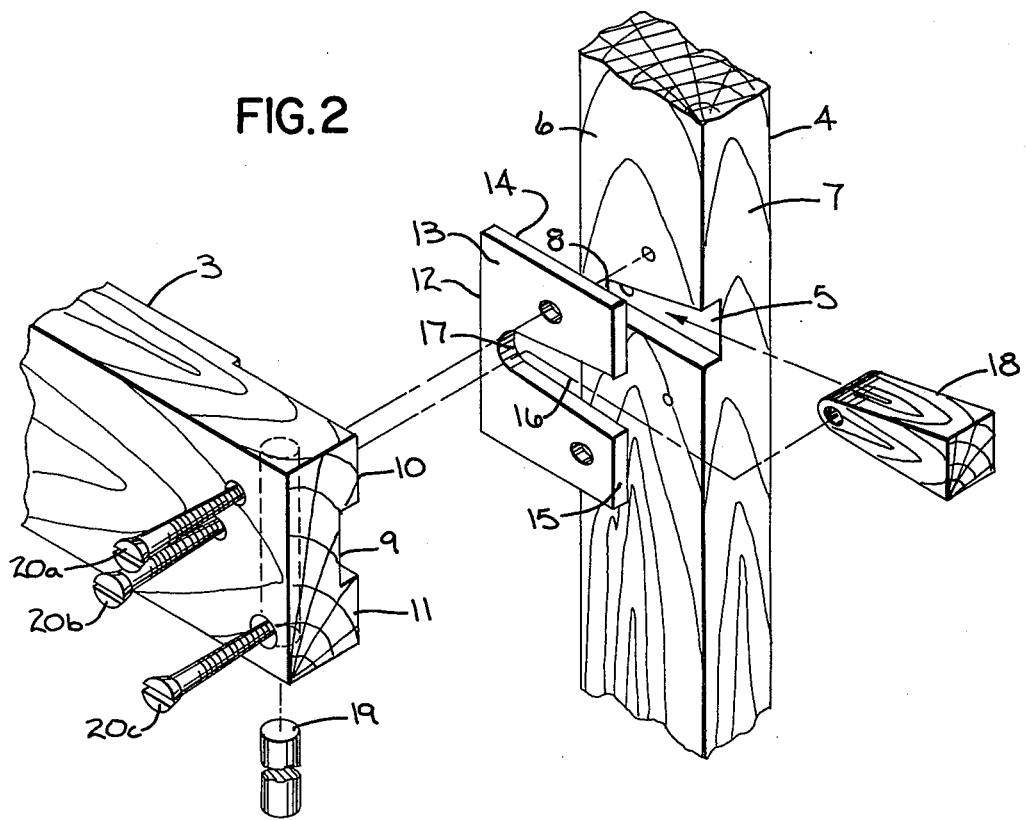
FIG. 2 is an exploded perspective view of the joint assembly of the present invention.

An article of furniture 1 utilizes a joint assembly 2 to connect the side rail 3 to the back post 4. While joint assembly 2 is shown in use at the rear joint of a chair, it is possible to use such a joint assembly to connect any two furniture components. However, joint assembly 2 is particularly useful at the rear joint because of the great bending, rotational and shear forces present in this area.

Back post 4 is prepared for the joint assembly by routing a wedge shaped groove 5 along the side surface 6 of back post 4. Groove 5 extends inwardly along side surface 6 from rear edge 7 of back post 4 and the narrower end 8 of wedge shaped groove 5 is located inwardly of rear edge 7.

Similarly side rail 3 is prepared for the joint assembly by routing a wedge shaped groove 9 along side surface 10 of side rail 3. Wedge shaped groove 9 extends inwardly along side surface 10 from rear edge 11 and as with back post 4 the narrow end of groove 9 is located inwardly of rear edge 11.

A chip member 12 having opposed parallel surfaces 13 and 14 that terminate in edge surface 15 is disposed between side rail 3 and back post 4. A wedge shaped notch 16 extends inwardly from edge surface 15 and terminates in a narrower end 17 located inwardly of edge surface 15. Chip member 12 provides proper spacing between side rail 3 and back post 4 so that a series of chairs may be vertically stacked for storage purposes.

When side rail 3, back post 4 and chip member 12 are joined in an aligned relationship, wedge shaped grooves 5 and 9 cooperate with wedge shaped notch 16 to define a wedge shaped recess with an opening along the surface formed by the joining of the three components. A wedge 18 is then driven into the recess.

In the assembly of joint 2 glue is applied to side surfaces 6 and 10 of back post 4 and side rail 3 and also along surfaces 13 and 14 of chip member 12. These surfaces provide a maximum area for the application of the glue and this results in a joint assembly with superior strength.

A dowel 19 is disposed in side rail 3 to prevent wood failure from the bending forces associated with a side rail.

While the use of other materials is possible it should be noted that furniture article 1 is formed from wood and that the grain of the wood in the dowel 19 is perpendicular to the grain of the wood in side rail 3 and that the grain of the wood in wedge 18 is perpendicular to the grain of the wood in back post 4. Such a relationship between the grains in the various components also serves to counteract the shearing forces present in the rear joint of a chair.

In addition to the use of adhesive as described above, the joint assembly 2 also utilizes a series of screws 20a through 20c to further tighten the joint assemly and to secure chip member 12 and wedge 18 in place.

Screws 20a and 20c are located on opposite sides of dowel 19 and pass through side rail 3, chip member 12 and into back post 4 while screw 20b passes through side rail 3, wedge 18 and into back post 4. Screw 20b acts to pin wedge 18 in place and also acts to counteract the rotational forces acting on the joint.

Various modes of carrying out the invention are contemplated as being within the scope of the following claims, particularly pointing out and distinctly claiming the subject matter which is regarded as the invention.

We claim:

1. A joint assembly in an article of furniture comprising:
    a first elongated furniture component having a surface and having a wedge shaped groove extending inwardly along said surface of said component,
    a second elongated furniture component connected to said first component such that the longitudinal axes of said components are substantially perpendicular to each other and one of said longitudinal axes lies in a substantially vertical plane and said second component having a surface, said surface having a wedge shaped groove extending inwardly along said surface, said wedge shaped grooves in said first and second furniture components having substantially equal dimensions and being in alignment, said grooves in said first and second components cooperating to define a wedge receiving recess located along the surface formed by the joining of said first and second components, and a wedge member disposed within said wedge receiving recess.

2. A joint assembly in an article of furniture comprising:

a first elongated furniture component having a first edge and a first surface, said first edge and said first surface being disposed substantially perpendicular to each other and defining a first corner, said first furniture component having a wedge shaped groove extending inwardly along said first surface from said first edge, a second elongated furniture component connected to said first component such that the longitudinal axes of said components are substantially perpendicular to each other and one of said longitudinal axes lies in a substantially vertical plane and said second component having a second edge and a second surface being disposed substantially perpendicular to each other and defining a second corner, said second furniture component having a wedge shaped groove extending inwardly along said second surface from said second edge, said grooves in said first and second components cooperating to define a wedge receiving recess, and a wedge member disposed within said wedge receiving opening.

3. The joint assembly defined in claim 1 further comprising a chip member disposed between said first and second components and having a wedge shaped notch, said notch extending inwardly from the edge of said chip member and cooperating with said grooves in said first and second components to define a wedge receiving recess located along the surface formed by the joining of said first and second components and said chip member.

4. The joint assembly defined in claim 2 further comprising a chip member disposed between said first and second components and having third and fourth opposed parallel surfaces terminating in a third edge, said chip member having a wedge shaped notch extending inwardly from said third edge and aligned with said grooves in said first and second components to define a wedge receiving recess.

5. The joint assembly defined in claim 2 wherein said wedge receiving opening is itself wedge shaped and has its narrower end disposed inwardly of the surface formed by the joining of said first and second edges.

6. The joint assembly defined in claim 1 or 2 wherein said first component comprises the back post of a chair and said second component comprises the side rail of a chair.

7. The joint assembly defined in claim 6 further comprising a dowel member disposed in said second component substantially perpendicular to the longitudinal axis of said wedge receiving recess.

8. The joint assembly defined in claim 1 or 2 further comprising first fastening means engaging said first and second components to secure said first and second components in a joined relationship.

9. The joint assembly defined in claim 1 or 2 further comprising second fastening means engaging said first and second components and said wedge member to secure said first and second components and said wedge member in a joined relationship.

10. The joint assembly defined in claim 1 or 2 wherein said first and second components and said wedge member are formed from wood and wherein the grain of the wood in said first component is substantially perpendicular to the grain of the wood in said second component and wherein the grain of the wood in said wedge member is substantially perpendicular to the grain of the wood in one of said components.

11. The joint assembly defined in claim 7 wherein said dowel and said second component are formed from wood and wherein the grain of the wood in said dowel is substantially perpendicular to the grain of the wood in said second component.

12. The joint assembly defined in claim 7 further comprising a plurality of fastening means, at least one of said fastening means engaging said first and second component and at least one of said fastening means engaging said first and second components and said wedge member, said fastening means being disposed on both sides of the longitudinal axis of said dowel.

13. A joint assembly in an article of furniture comprising:

a first furniture component having a surface and having a wedge shaped groove extending inwardly along said surface of said component, a second furniture component connected to said first component and having a surface, said surface having a wedge shaped groove extending inwardly along said surface, said wedge shaped grooves in said first and second furniture components having substantially equal dimensions and being in alignment, a chip member disposed between said first and second components and having a wedge shaped notch, said notch extending inwardly from the edge of said chip member and cooperating with said grooves in said first and second components to define a wedge receiving recess located along the surface formed by the joining of said first and second components and said chip member, and a wedge member disposed within said wedge receiving recess.

14. A joint assembly in an article of furniture comprising:

a first furniture component having a first edge and a first surface, said first edge and said first surface being disposed substantially perpendicular to each other and defining a first corner, said first furniture component having a wedge shaped groove extending inwardly along said first surface from said first edge, a second furniture component connected to said first component and having a second edge and a second surface being disposed substantially perpendicular to each other and defining a second corner, said second furniture component having a wedge shaped groove extending inwardly along said second surface from said second edge a chip member disposed between said first and second components and having third and fourth opposed parallel surfaces terminating in a third edge, said chip member having a wedge shaped notch extending inwardly from said third edge and aligned with said grooves in said first and second components to define a wedge receiving recess, and a wedge member disposed within said wedge receiving opening.

* * * * *